(12) United States Patent
Wakashiro et al.

(10) Patent No.: US 6,424,053 B1
(45) Date of Patent: Jul. 23, 2002

(54) CONTROL APPARATUS FOR HYBRID VEHICLE

(75) Inventors: Teruo Wakashiro; Takashi Kiyomiya; Atsushi Matsubara; Hideyuki Oki; Yasuo Nakamoto; Atsushi Izumiura, all of Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 69 days.

(21) Appl. No.: 09/679,448

(22) Filed: Oct. 4, 2000

(30) Foreign Application Priority Data

Oct. 8, 1999 (JP) ............................................ 11-288751

(51) Int. Cl.[7] ................................................. H02P 9/04
(52) U.S. Cl. ................................... 290/40 C; 180/65.2
(58) Field of Search ........................ 290/40 C; 180/65.2, 180/65.4

(56) References Cited

U.S. PATENT DOCUMENTS

| | | | | |
|---|---|---|---|---|
| 5,621,304 A | * | 4/1997 | Kiuchi et al. | 290/40 C |
| 5,751,137 A | * | 5/1998 | Kiuchi et al. | 180/65.4 |
| 5,862,497 A | * | 1/1999 | Yano et al. | 180/65.2 |
| 5,867,009 A | * | 2/1999 | Kiuchi et al. | 180/165 |
| 5,875,864 A | * | 3/1999 | Yano et al. | 123/198 DB |
| 5,886,416 A | * | 3/1999 | Arai | 123/352 |
| 5,978,719 A | * | 11/1999 | Yano et al. | 123/333 |
| 5,984,033 A | * | 11/1999 | Tamagawa et al. | 180/65.2 |
| 6,026,921 A | * | 2/2000 | Aoyama et al. | 123/348 |
| 6,127,813 A | * | 10/2000 | Tamagawa | 290/40 C |

FOREIGN PATENT DOCUMENTS

| | | | | |
|---|---|---|---|---|
| DE | 10049510 A1 | * | 5/2001 | B60K/06/02 |
| JP | 07-123509 | | 5/1995 | |

* cited by examiner

*Primary Examiner*—Joseph Waks
(74) *Attorney, Agent, or Firm*—Armstrong, Westerman & Hattori, LLP

(57) ABSTRACT

The control apparatus for the hybrid vehicle is provided with a combustion engine for outputting a driving force, an electric motor for generating a force for assisting the output from the engine, a power storage unit for storing electric energy generated by the motor acting as a generator using the output from the engine and electric energy regenerated by the motor when the vehicle decelerates. The control apparatus including: an engine temperature measuring device for measuring the temperature of the engine; and a generated energy increasing device for increasing the energy generated by the motor acting as a generator when the vehicle is traveling by the driving force from the engine without the assistance of the motor, and when the engine temperature measuring device determines that the temperature of the engine is equal to or below a predetermined temperature.

6 Claims, 11 Drawing Sheets

CONTROL APPARATUS FOR HYBRID VEHICLE

BACKGROUND OF THE INVENTION

1. Field of the Invention

The present invention relates to a control apparatus for a hybrid vehicle for driving a combustion engine and an electric motor, and in particular, to a control apparatus for a hybrid vehicle that increases the temperature of water in the engine, which relates to the temperature of the engine itself, when the vehicle is cruising.

This application is based on Japanese Patent Application No. 11-288751, the contents of which are incorporated herein by reference.

2. Description of the Related Art

Conventionally, hybrid vehicles which carry electric motors as power sources for driving the vehicles in addition to engines are known.

In the conventional hybrid vehicles, there are parallel hybrid vehicles which use motors as assisting driving sources for assisting the output from the engines. The parallel hybrid vehicle assists the output from the engine by the motor when the vehicle accelerates, charges a battery by deceleration regeneration when the vehicle decelerates, and performs various controls, to respond the driver's demands while maintaining the remaining charge of the battery (as disclosed in Japanese Unexamined Patent Application, First Publication No. Hei 7-123509).

To improve the fuel consumption of the conventional hybrid vehicle, gear ratios are made so high that the vehicle can travel at a low engine speed to increase energy regenerated by the motor, and an idling stop mode is provided so that, when the hybrid vehicle is stopped, the engine is stopped or the period for which the fuel supply to the engine is stopped is extended. Therefore, the temperature of the water in the engine is rises with difficulty, and the performance of a heater using the water temperature of the engine for air conditioning in the vehicle may be degraded.

BRIEF SUMMARY OF THE INVENTION

It is therefore an object of the present invention to provide a control apparatus for a hybrid vehicle which can improve the performance of the heater by quickly increasing the temperature of the water in the engine even in a cruise mode in which the vehicle is traveling by the driving force produced by the engine without assistance by the motor.

In a first aspect of the present invention, a control apparatus for a hybrid vehicle is provided with a combustion engine (E) for outputting a driving force, an electric motor (M) for generating a force for assisting the output from the engine, and a power storage unit (battery 22) for storing electric energy generated by the motor acting as a generator using the output from the engine and electric energy regenerated by the motor when the vehicle decelerates. The control apparatus comprises: an engine temperature measuring device (steps S401, S402, and S407) for measuring the temperature of the engine, and a generated energy increasing device (step S409) for increasing the energy generated by the motor acting as a generator when the vehicle is traveling by the driving force from the engine without the assistance of the motor, and when the engine temperature measuring device determines that the temperature of the engine is equal to or below a predetermined temperature.

According to the control apparatus for the hybrid vehicle, in a cruise mode in which the vehicle is traveling by the driving force from the engine without the assistance of the motor, the energy generated by the motor is increased, and the charging current is supplied to the power storage unit, causing the Joule heat due to the internal resistance of the power storage unit, which warms the power storage unit. Further, the load on the engine due to the generation is increased, thereby quickly increasing the engine water temperature.

In a second aspect of the present invention, the engine temperature measuring device comprises: an intake air temperature measuring device (step S401) for measuring the temperature inside an air intake passage in the engine (intake air temperature TA); an outside air temperature calculator (step S402) for calculating the temperature outside the vehicle (outside air estimated temperature TAFCMG); and an engine water temperature measuring device (step S407) for measuring the temperature of water in the engine (engine water temperature TW).

The control apparatus for the hybrid vehicle increases the energy generated by the motor, when the intake air temperature measuring device determines that the temperature inside the air intake passage is equal to or below a predetermined temperature (battery/heater warming determination execution lower limit temperature #TABWARM), when the outside air temperature calculator determines that the temperature outside the vehicle is equal to or below a predetermined temperature (battery/heater warming determination execution lower limit estimated temperature #TAHWARM), or when the engine water temperature measuring device determines that the temperature of water in the engine is equal to or below a predetermined temperature (battery/heater warming determination execution lower limit water temperature #TWBWARM).

In a third aspect of the present invention, the control apparatus for the hybrid vehicle further comprises: a remaining charge measuring device (battery ECU 13) for measuring the remaining charge of the power storage unit; and a generation regulating threshold value corrector (step S302) for increasing a threshold value for regulating the generation by the motor when the generated energy increasing device increases the energy generated by the motor (step S303), the threshold value being set depending on the remaining charge measured by the remaining charge measuring device.

When it is determined that the power storage unit is over-charged while the engine water temperature is sufficiently high, the generation by the motor is prohibited, and the power storage unit is not further charged. When the generated energy increasing device increases the generated energy in order to increase the engine water temperature, the generation regulating threshold value of the remaining charge for stopping the generation by the motor is increased so that the charging of the power storage unit is continued. The charging current causes the Joule heat due to the internal resistance of the power storage unit, which warms the power storage unit. Further, the load on the engine due to the generation is increased, thereby quickly increasing the engine water temperature.

In a fourth aspect of the present invention, the control apparatus for the hybrid vehicle further comprises: a voltage variation detector (battery ECU 13) for detecting a variation in the voltage of the power storage unit; and an ignition timing retarding (delaying) device (FIECU 12) for retarding (delaying) an ignition timing in the engine when the remaining charge exceeds the threshold value (SOC2) and reaches the fully-charged state, or when the voltage variation detector detects a predetermined variation of the voltage.

When the power storage unit is fully charged, that is, when the power storage unit cannot receive any charging current, the engine water temperature is increased by retarding the ignition timing in the engine so as to reduce the combustion efficiency. This increases the temperature of the heater, and the power storage unit can be warmed by the fans of the heater. As the power storage unit is warmed, the amount of assistance and the amount of regeneration by the motor M can be quickly increased, thereby improving the fuel consumption.

DETAILED DESCRIPTION OF THE INVENTION

Figure 1:
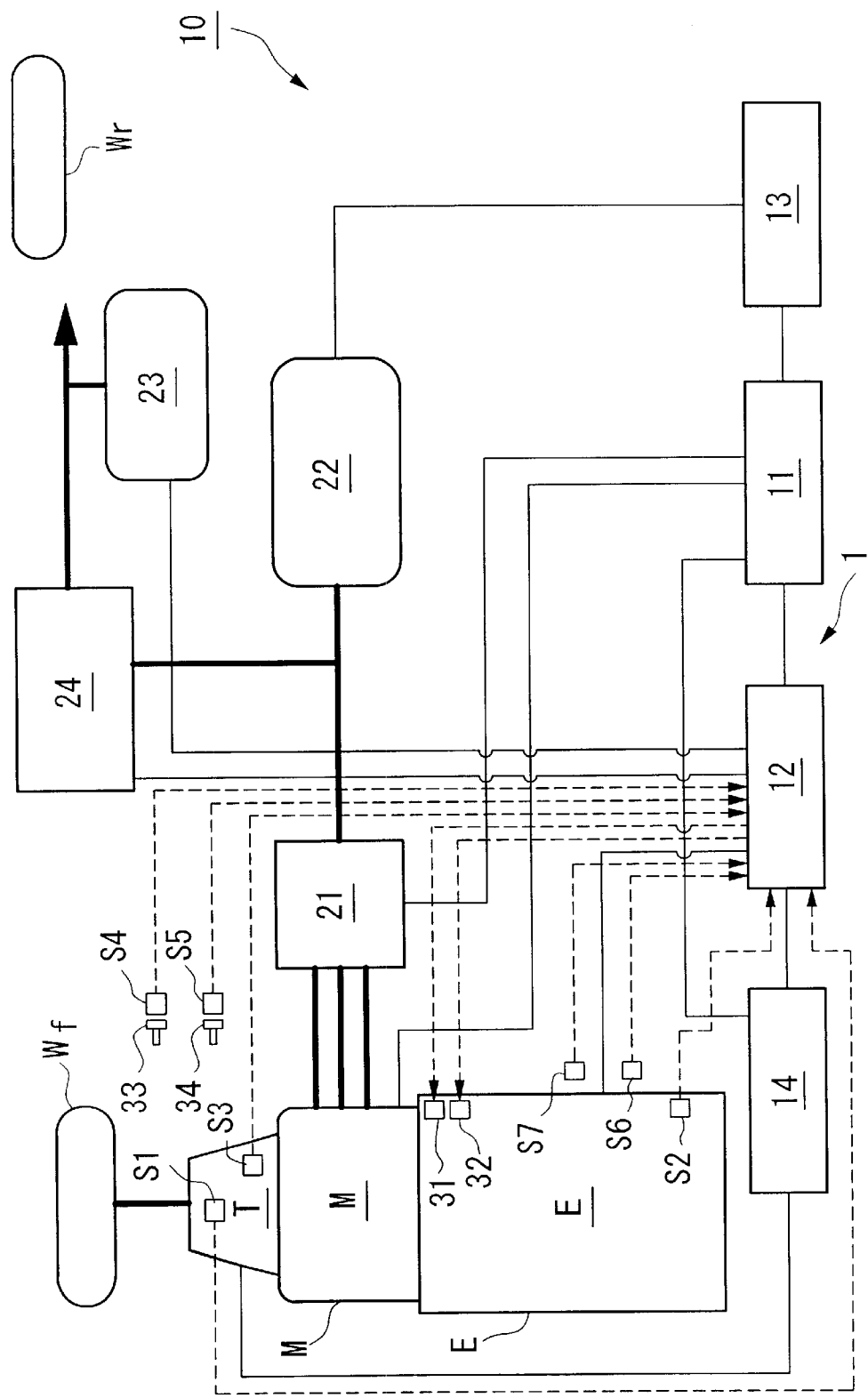
FIG. 1 is a diagram showing the structure of the hybrid vehicle with the control apparatus of the present invention.

The embodiment of the control apparatus for the hybrid vehicle of the present invention will be explained with reference to the figures. FIG. 1 is a diagram showing the structure of the hybrid vehicle 10 having the control apparatus 1 of the present invention.

The hybrid vehicle 10 is a parallel hybrid vehicle. Driving forces from both an engine E and a motor M are transmitted via a transmission T of an automatic or manual transmission, to front wheels Wf which are the drive wheels. When the hybrid vehicle decelerates and the driving force is transmitted from the front wheels Wf to the motor M, the motor M acts as a generator to generate what is termed a regenerative braking force, so that the kinetic energy of the vehicle body is stored as electric energy.

The control apparatus 1 for the hybrid vehicle of the present invention comprises a motor ECU 11, an FIECU 12, a battery ECU 13, and a CVTECU 14.

A power drive unit 21 performs the driving and regeneration of the motor M in response to control commands from a motor ECU 11. A high-voltage battery 22 for sending and receiving electric energy to and from the motor M is connected to the power drive unit 21. The battery 22 includes a number of, e.g., ten modules connected in series, each module having a number of, e.g., twenty cells connected in series. The hybrid vehicle 10 includes a 12-volt auxiliary battery 23 for driving various accessories. The auxiliary battery 23 is connected to the battery 22 via a downverter 24. The downverter 24, controlled by an FIECU 12, reduces the voltage from the battery 22 and charges the auxiliary battery 23.

The FIECU 12 controls, in addition to the motor ECU 11 and the downverter 24, a fuel supply amount controller 31 for controlling the amount of fuel supplied to the engine E, a starter motor 32, an ignition timing, etc. Therefore, the FIECU 12 receives a signal from a speed sensor $S_1$ for detecting the vehicle speed V based on the rotation of the driving shaft of the transmission T, a signal from an engine rotational speed sensor $S_2$ for detecting the engine rotational speed NE, a signal from a shift position sensor $S_3$ for detecting the shift position of the transmission T, a signal from a brake switch $S_4$ for detecting operation of a brake pedal 33, a signal from a clutch switch $S_5$ for detecting operation of a clutch pedal 34, a signal from a throttle valve opening sensor $S_6$ for detecting the throttle opening state TH, and a signal from an air intake passage pressure sensor $S_7$ for detecting the air intake passage pressure PB.

The battery ECU 13 protects the battery 22, and calculates the state of charge (remaining charge) SOC of the battery 22. The CVTECU 14 controls the CVT.

The control modes of the hybrid vehicle 10 are "idling stop mode", "idling mode", "deceleration mode", "acceleration mode", and "cruise mode."

Figure 2:
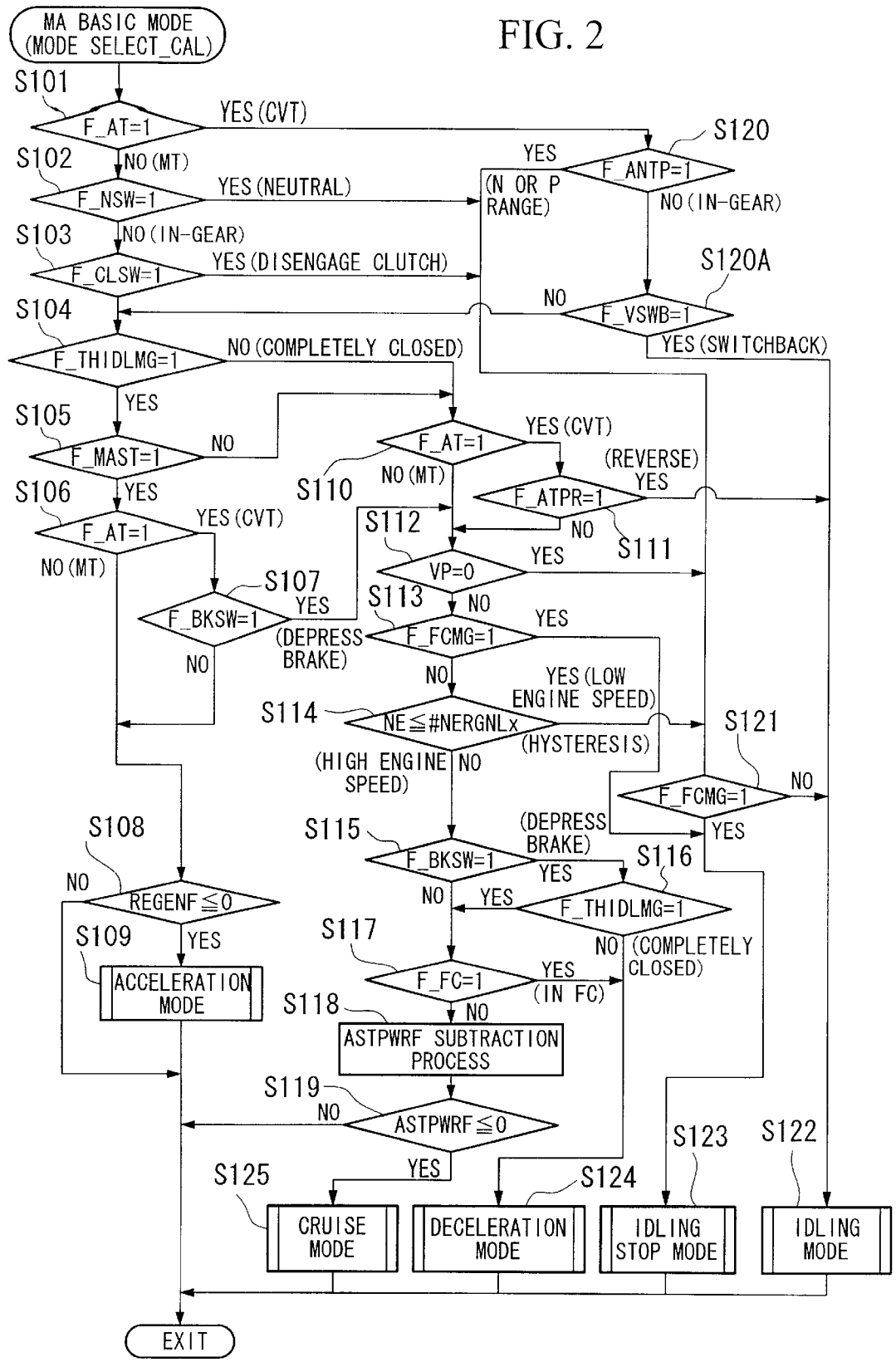
FIG. 2 is a flowchart showing a motor operation mode determination according to the present invention.

Referring to the flowchart of FIG. 2, the process for determining the motor operation mode will be explained.

In step S101, it is determined whether a MT/CVT determination flag F_AT is 1. When this determination is NO, that is, when the vehicle is an MT vehicle, the flow proceeds to step S102, which is described below.

When the determination is YES, that is, when the vehicle is a CVT vehicle, the flow proceeds to step S120, and it is then determined whether a CVT in-gear determination flag F_ATNP is 1. When in step S120 the determination is NO, that is, when in the in-gear state, the flow proceeds to step S120A, and it is then determined whether a switch back determination flag F_VSWB is 1. When this determination is NO, that is, when a shift lever is not being operated, the process following step S104 is performed. When in step S120A the determination is YES, that is, when the shift lever is being operated, the flow proceeds to step S122, enters the idling mode, and the control terminates. In the idling mode, the supply of the fuel supply is stopped, and is then restarted, and the idling of the engine E is continued.

When in step S120 the determination is YES, that is, when in the N-(neutral) or P-(parking) range, the flow proceeds to step S121, and it is determined whether an engine stop control execution flag F_FCMG is 1. When this determination is No, the flow enters idling mode in step S122, and the control terminates.

When in step S121 the engine stop control execution flag F_FCMG is 1, the flow proceeds to step S123, and enters idling stop mode, and the control terminates. In the idling stop mode, the engine E is stopped under specified conditions when the hybrid vehicle 10 is stopped.

In step S102, it is determined whether a neutral position determination flag F_NSW is 1. When this determination is YES, that is, when in the neutral position, the process following step S121 is performed.

When the determination is NO, that is, when in the in-gear state, the flow proceeds to step S103, and it is determined whether a clutch engagement determination flag F_CLSW is 1. When the determination is YES, that is, when the clutch is disengaged, the flow proceeds to step S121.

When in step S 103 the determination is NO, that is, when the clutch is engaged, the flow proceeds to step S104.

In step S104, it is determined whether an IDLE determination flag F_THIDLMG is 1. When this determination is NO, that is, when the throttle is completely closed, the flow proceeds to step S110, which will be described below.

When in step S104 the determination is YES, that is, when the throttle is not completely closed, the flow proceeds to step S105, and it is determined whether a motor assistance determination flag F_MAST is 1.

When in step S105 the determination is NO, the flow proceeds to step S110, which will be described below. When in step S105 the determination is YES, the flow proceeds to step S106.

In step S106, it is determined whether the MT/CVT determination flag F_AT is 1. When the determination is NO, that is, when the vehicle is an MT vehicle, the flow proceeds to step S108, and it is determined whether a final charging command value REGENF is equal to or below zero. When this determination is NO, the control terminates. When in step S108 the determination is YES, the flow proceeds to the acceleration mode in step S109, and the control terminates.

When in step S106 the determination is YES, that is, the vehicle is a CVT vehicle, the flow proceeds to step S107, and it is determined whether a brake ON determination flag F_BKSW is 1. When the determination is YES, that is, when the driver is depressing the brake, the flow proceeds to step S112, which will be described below.

When in step S107 the determination is NO, that is, when the driver is not depressing the brake, the flow proceeds to step S108.

In step S110, it is determined whether the MT/CVT determination flag F_AT is 1. When this determination is NO, that is, when the vehicle is an MT vehicle, the flow proceeds to step S112.

When in step S110 the determination is YES, that is, when the vehicle is a CVT vehicle, the flow proceeds to step S111, and it is determined whether a CVT reverse position determination flag F_ATPR is 1. When this determination is YES, that is, when in the reverse position, the flow proceeds to step S122, and enters the idling mode, and the control terminates.

When in step S111 the determination is NO, that is, when not in the reverse position, the flow proceeds to step S112.

In step S112, it is determined whether a vehicle speed VP for controlling the engine is zero. When this determination is YES, that is, when the vehicle speed VP for controlling the engine is zero, the flow proceeds to step S121.

When in step S112 the determination is NO, that is, when the vehicle speed VP for controlling the engine is not zero, the flow proceeds to step S113.

In step S113, it is determined whether an engine stop control execution flag F_FCMG is 1. When this determination is YES, the flow proceeds to step S123, and enters the idling stop mode, and the control terminates.

When in step S113 the determination is NO, the flow proceeds to step S114.

In step S114, an engine speed NE is compared with a cruise/deceleration mode lower limit engine speed #NERGNLx. Character "x" in the cruise/deceleration mode lower limit engine speed #NERGNLx indicates a value set for each gear (which includes hysteresis).

As the result of the comparison in step S114, when the engine speed NE≦the cruse/deceleration mode lower limit engine speed #NERGNLx, that is, when the engine speed is low, the flow proceeds to step S121. When NE>#NERGNLx, that is, when the engine speed is high, the flow proceeds to step S115.

In step S115, it is determined whether the brake ON determination flag F_BKSW is 1. When this determination is NO, that is, the driver is not depressing the brake, the flow proceeds to step S117. When the determination is YES, that is, the driver is depressing the brake, the flow proceeds to step S116.

In step S116, it is determined whether the IDLE determination flag F_THIDLMG is 1. When this determination is NO, that is, when the throttle is completely closed, the flow proceeds to step S124, and enters the deceleration mode, and the control terminates.

When in step S116 the determination is YES, that is, when the throttle is not completely closed, the flow proceeds to step S117.

In step S117, it is determined whether a fuel supply cut execution flag F_FC is 1. When this determination is YES, that is, when the fuel supply is stopped, the flow proceeds to step S124, and enters the deceleration mode, and the control terminates. When the determination is NO, the flow proceeds to step S118.

In step S118, a final assistance command value ASTPWRF is subtracted, and the flow proceeds to step S119.

In step S119, it is determined whether the final assistance command value ASTPWRF is equal to or below zero. When this determination is YES, the flow proceeds to step S125, and enters the cruise mode. When in step S119 the determination is NO, the control terminates.

Next, the process in the cruise mode in step S125 will be explained.

Figure 3:
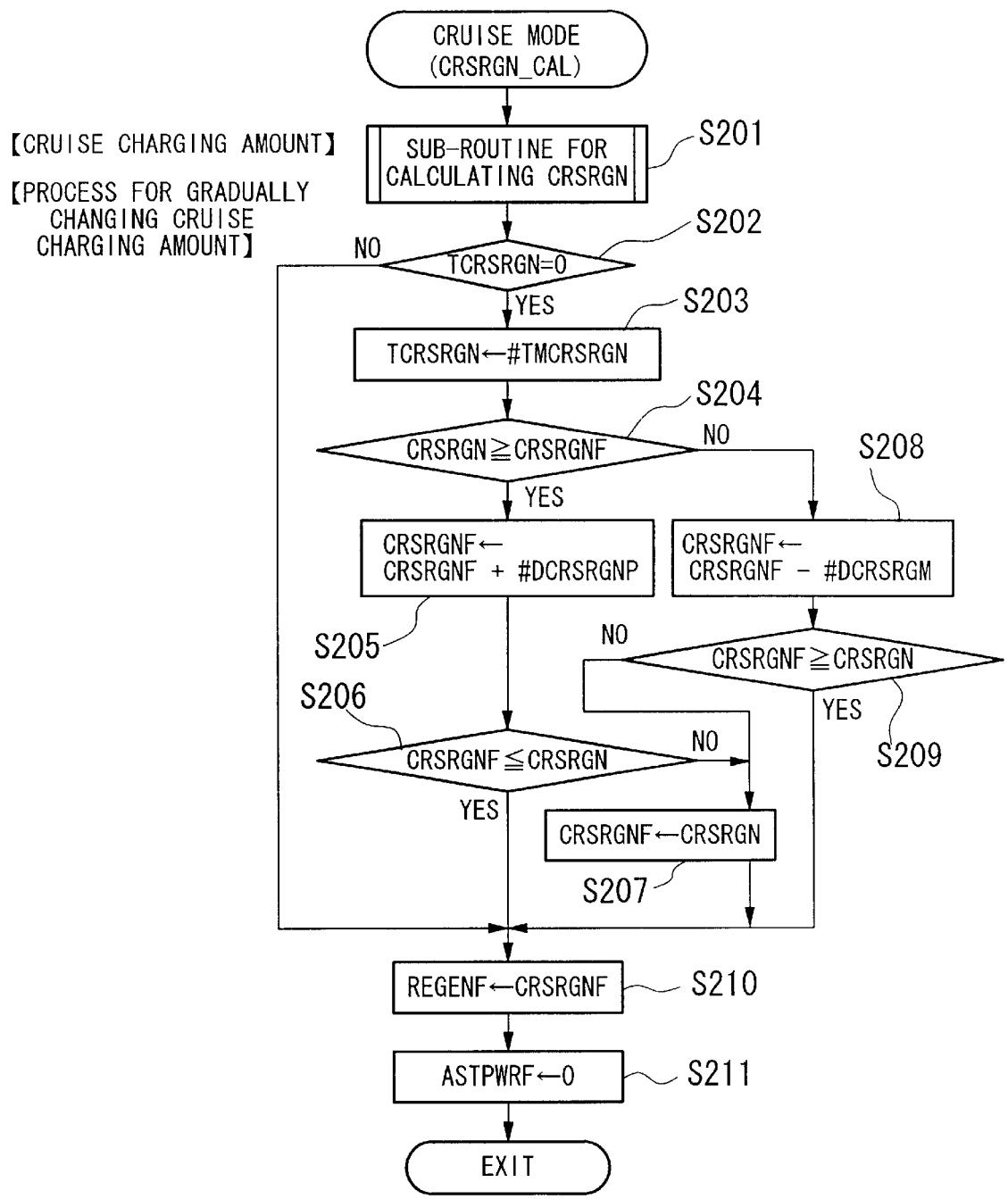
FIG. 3 is a flowchart showing an operation in a cruise mode according to the present invention.

As shown in FIG. 3, step S201 performs a sub-routine for calculating the target cruise charging amount CRSRGN, which will be described below.

Then, it is determined whether a gradual addition/subtraction updating timer TCRSRGN is zero (step S202). When this determination is NO, the process following step S210, which will be described below, is performed.

When in step S202 the determination is YES, the gradual additional/subtractive updating timer TCRSRGN is set to a predetermined gradual additional/subtractive updating timer value #TMCRSRGN (step S203).

In step S204, it is determined whether the target cruise charging amount CRSRGN is equal to or above a cruise charging amount final calculated value CRSRGNF. When this determination is YES, that is, when CRSRGN≧CRSRGNF, the flow proceeds to step S205. In step S205, a gradual addition factor #DCRSRGNP is added to the CRSRGNF to obtain a new CRSRGNF. Then, it is determined whether the CRSRGNF is equal to or below the CRSRGN (step S206). When this determination is YES, the flow proceeds to step S210.

When in step S206 the determination is NO, the cruise charging amount final calculated value CRSRGNF is set to the target cruise charging amount CRSRGN (step S207), and the process following step S210, which will be described below, is performed.

When in step S204 the determination is NO, that is, when the target cruise charging amount CRSRGN<the cruise charging final calculated value CRSRGNF, a gradual subtraction factor #DCRSRGNM is subtracted from the CRSRGNF to obtain a new CRSRGNF (step S208), and it is determined whether the CRSRGNF is equal to or above the CRSRGN (step S209). When this determination is NO, the flow proceeds to step S207.

When in step S209 the determination is YES, the flow proceeds to step S210.

In step S210, the final charging command value REGENF is set to the cruise charging final calculated value CRSRGNF, the final assistance command value ASTPWRF is set to zero (step S211), and the control terminates.

Next, the process of the sub-routine for calculating the target cruise charging amount CRSRGN in step S201 will be explained with reference to FIGS. 4 to 9.

Figure 4:
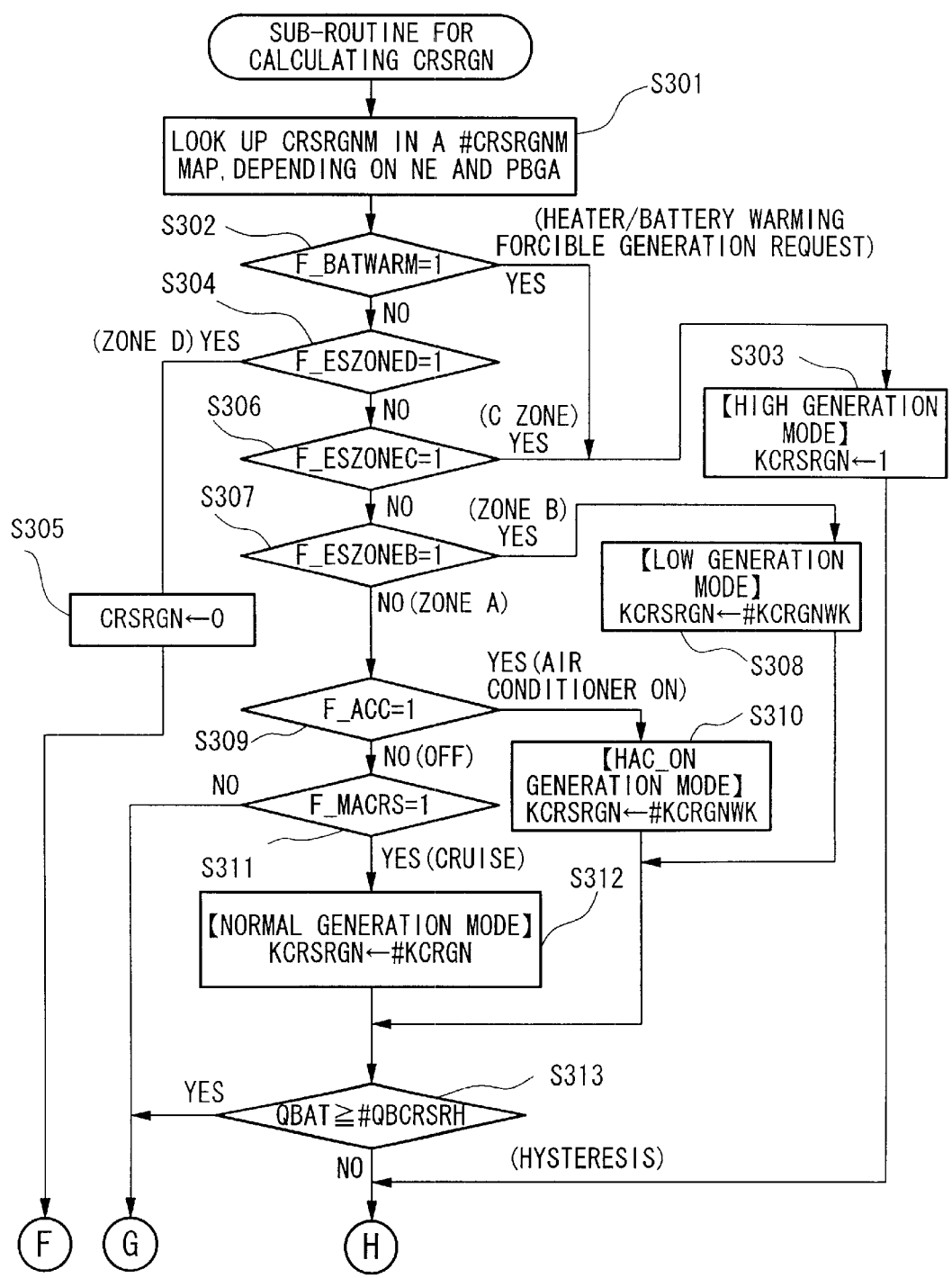
FIG. 4 is a flowchart showing a process for calculating a target amount of cruise charging in the cruise mode according to the present invention.
Figure 5:
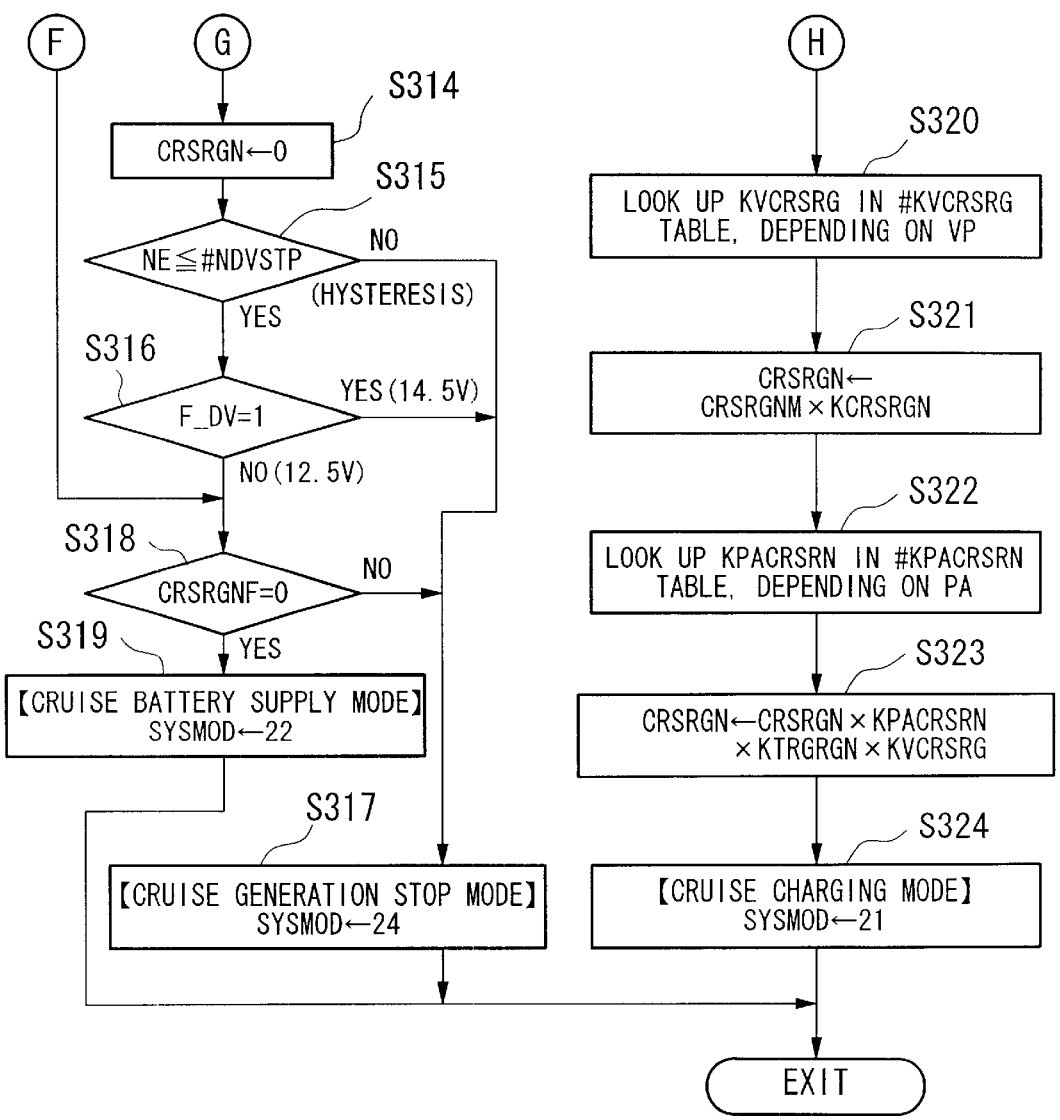
FIG. 5 is a flowchart showing a process for calculating a target amount of cruise charging in the cruise mode according to the present invention.

As shown in FIG. 4, in step S301, a map value CRSRGNM of a cruise generation amount is looked up in a map. The map defines the cruise generating amount, depending on the engine speed NE and the air intake passage pressure PBGA. The map is changed, depending on the MT or the CVT (not shown).

In step S302, it is determined whether a battery/heater warming control request flag F_BATWARM, which is set in the process for determining whether the battery and the heater are warmed up, which will be explained below, is 1. When this determination is YES, the flow proceeds to step S303, a correction coefficient KCRSRGN for correcting the cruise generating amount is set to 1 (high generation mode), and the flow proceeds to step S320.

When in step S302 the determination is NO, an energy storage zone D determination flag F_ESZONED is 1 (step S304).

In this embodiment, the battery ECU 13 defines four zones, e.g., A, B, C, and D, for the remaining battery charge SOC (state of charge), which is calculated based on the voltage, the discharged electric current, and the temperature. Zone A (from 40% to 80 or 90% of the SOC), which is the normal use zone, is defined as the standard. Zone B (from 20% to 40% of the SOC), which is a temporary use zone, is below zone A, and zone C (from 0% to 20% of the SOC), which is an over-discharge zone, is below zone B. Zone D (from 80% or 90% to 100% of the SOC), which is an overcharge zone, is above zone A.

When in step S304 the determination is YES, that is, when the remaining battery charge SOC is in zone D, which is the overcharge zone, the flow proceeds to step S305, the target cruise charging amount CRSRGN is set to zero, and the flow proceeds to step S318.

When in step S304 the determination is NO, that is, when the remaining battery charge SOC is not in zone D, which is the overcharge zone, the flow proceeds to step S306, and it is determined whether an energy storage zone C determination flag F_ESZONEC is 1. When this determination is YES, that is, when the remaining battery charge is in zone C, which is the over discharge zone, the flow proceeds to step S303.

When in step S306 the determination is NO, the flow proceeds to step S307.

In step S307, it is determined whether an energy storage zone B determination flag F_ESZONEB is 1. When this determination is YES, that is, when in zone B, which is the temporary use zone, the charging is lower than that in zone C, the flow proceeds to step S308.

In step S308, the correction coefficient KCRSRGN for correcting the amount of cruise generation is set to a cruise generation amount coefficient #KCRGNWK (low generation mode), and the flow proceeds to step S313.

When in step S307 the determination is NO, the flow proceeds to step S309, and it is determined whether an air conditioner ON flag F_ACC is 1. When the determination is YES, that is, when the air conditioner is turned on, the flow proceeds to step S310, the correction coefficient KCRSRGN for correcting the amount of cruise generation is set to a predetermined cruise generation amount coefficient #KCRGNHAC (HAC_ON generation mode), and the flow proceeds to step S313 which will be described below.

When in step S309 the determination is NO, that is, when the air conditioner is turned off, the flow proceeds to step S311, and it is determined whether a cruse driving determination flag F_MACRS is 1. When this determination is NO, that is, when not in the cruise mode, the flow proceeds to step S314, which will be described below.

When in step S311 the determination is YES, that is, when in the cruise mode, the correction coefficient KCRSRGN for correcting the amount of cruise generation is set to a cruise generation coefficient #KCRGN (for a normal generation mode) (step S312), and the flow proceeds to step S313.

In step S313, it is determined whether the remaining battery charge QBAT (which is the same as the remaining battery charge SOC defined for the upper limit of zone A) is equal to or above a normal generation mode execution upper limit remaining charge #QBCRSRH. The #QBCRSRH is a value with hysteresis. When this determination is NO, that is, when QBAT<#QBCRSRH, the flow proceeds to step S320.

When in step S313 the determination is YES, that is, when the remaining battery charge QBAT≧the normal generation mode execution upper limit remaining charge #QBCRSRH, the flow proceeds to step S314.

In step S314, the target cruise charging amount CRSRGN is set to zero, and the flow proceeds to step S315.

In step S315, it is determined whether the engine speed NE is equal to or below a cruise battery supply mode execution upper limit engine speed #NDVSTP. When this determination is NO, that is, when NE>#NDVSTP, the flow proceeds to step S317.

When in step S315 the determination is YES, that is, when the engine speed NE≦the cruise battery supply mode execution upper limit engine speed #NDVSTP, the flow proceeds to step S316. The #NDVSTP is a value with hysteresis.

In step S316, it is determined whether a 12V electric power generation necessity flag is 1. When this determination is YES, that is, when the load on the 12V system is high, the flow proceeds to step S317, and enters the cruise generation stop mode, and the control terminates.

When in step S316 the determination is NO, that is, when the load on the 12V system is low, the flow proceeds to step S318.

In step S318, it is determined whether the cruise charging amount final calculated value CRSRGNF is zero. When this determination is NO, the flow proceeds to step S317. When the determination is YES, the flow proceeds to step S319, and enters the cruise battery supply mode, and the control terminates.

Figure 6:
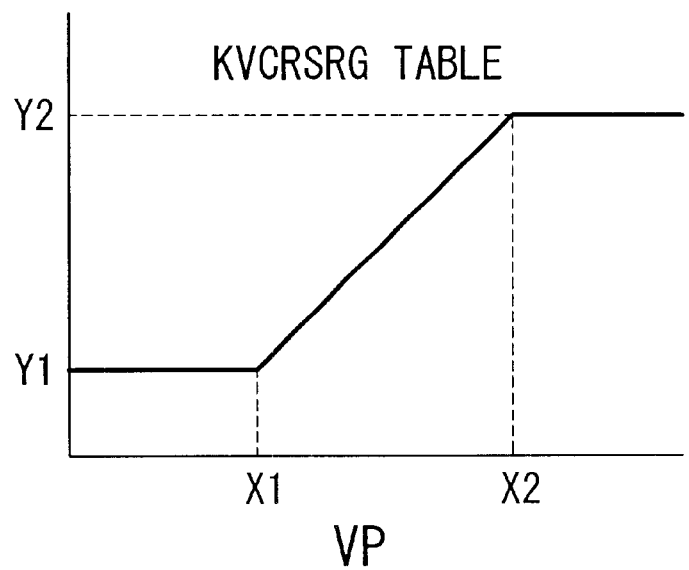
FIG. 6 is a graph showing a cruise generation amount subtractive coefficient KVCRSRG with respect to a vehicle speed VP according to the present invention.

In step S320, a cruise generation amount subtractive coefficient KVCRSRG, which is shown in FIG. 6, is looked up in a KVCRSRG table, depending on the vehicle speed VP for controlling the engine.

In step S321, the map CRSRGNM value of the amount of cruise generation is multiplied by the correction coefficient KCRSRGN for correcting the amount of cruise generation, and the target cruise charging amount CRSRGN is set to that calculated value.

Figure 7:
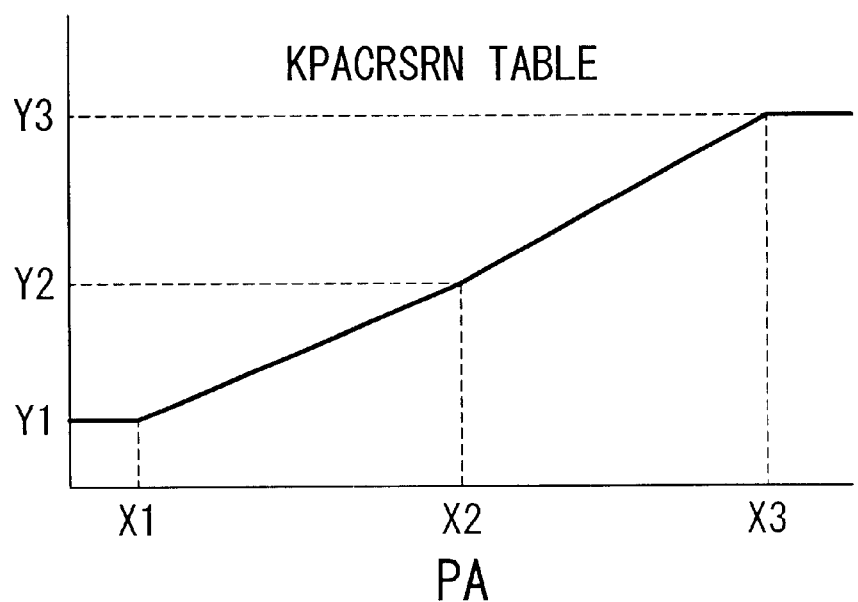
FIG. 7 is a graph showing a cruise generation amount correction coefficient KPACRSRN with respect to the atmospheric pressure PA according to the present invention.

The flow proceeds to step S322, and a correction coefficient KPACRSRN, which is shown in FIG. 7, for correcting the cruise generation amount PA is looked up in a KPACRSRN table, depending on the atmospheric pressure PA. In step S323, the target cruise charging amount CRSRGN is multiplied by the correction coefficient KPACRSRN for correcting the cruise generation amount PA, is multiplied by a cruise generation amount reduction coefficient KTRGRGN, and is multiplied by the cruise generation amount subtractive coefficient KVCRSRG. The final target cruise charging amount CRSRGN is set to that calculated value. Then, the flow enters the cruise charging mode in step S324.

Figure 8:
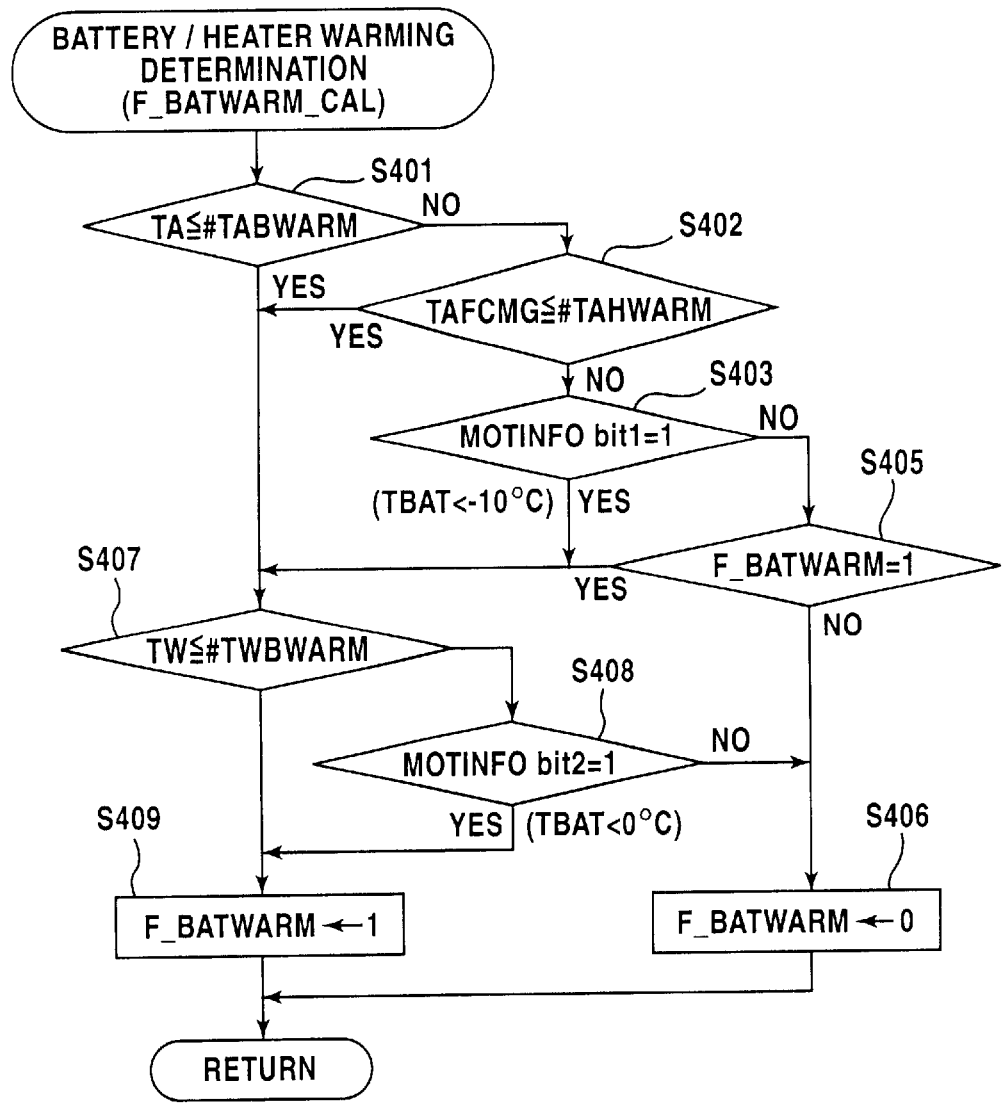
FIG. 8 is a flowchart showing a process for warming a battery and a heater of the present invention.

The battery/heater warming determination process for setting the battery/heater warming control request flag F_BATWARM, which is referred to in the above-described step S302, will be explained with reference to FIG. 8.

It is determined whether an intake air temperature TA is equal to or below a predetermined battery/heater warming determination execution lower limit temperature #TABWARM (step S401). The #TABWARM is not specifically limited, and is, for example, −10 degrees centigrade. When this determination is YES, the process following step S407 is performed.

When in step S401 the determination is NO, it is determined whether an outside air estimated temperature TAFCMG is equal to or below a battery/heater warming determination execution lower limit estimated temperature #TAHWARM (step S402). When this determination is YES, that is, when TAFCMG≦#TAHWARM, the process following step S407 is performed.

The outside air estimated temperature TAFCMG is looked up in a map, depending on the vehicle speed VP, the intake air temperature TA, and the engine water temperature TW of the hybrid vehicle 10 (not shown).

The process for determining the outside air estimated temperature TAFCMG takes into consideration the situation in which, even when the engine E has been started and the intake air temperature TA rises, the engine water temperature TW may be low because the outside air temperature is low. When TAFCMG is equal to or below the predetermined battery/heater warming determination execution lower limit estimated temperature #TAHWARM, that is, when in step S401 the determination is YES, the process following step S407, which is the same process as that when TA≦#TABWARM, is performed.

When in step S402 the determination is NO, that is, when the outside air estimated temperature TAFCMG>the battery/heater warming determination execution lower limit estimated temperature #TAHWARM, it is determined whether the battery temperature TBAT of the battery 22 is below a predetermined first temperature T1, e.g., −10 degrees centigrade (step S403). When this determination is YES, the process following step S407 is performed. This determination becomes YES when the vehicle has been parked in a cold area at night for many hours, the outside temperature then rises in the morning, but the battery temperature TBAT is low because the rise in temperature of the battery 22 is slow. In this situation, the battery 22 is to be warmed.

When in step S403 the determination is NO, it is determined whether a battery/heater warming control request flag F_BATWARM for warming the heater (not shown) or the battery 22 is 1, that is, whether the battery/heater warming control has been executed (step S405).

When in step S405 the determination is YES, the process following step S407 is performed. When the determination is NO, it is determined that it is unnecessary to warm the heater or the battery 22, the battery/heater warming control request flag F_BATWARM is set to 0 (step S406), and the control terminates.

In step S407, it is determined whether the engine water temperature TW is equal to or below a predetermined battery/heater warming determination execution lower limit water temperature #TWBWARM. The #TWBWARM has hysteresis, and the central value of the hysteresis is not limited, and is set to, e.g., 60 degrees.

When in step S407 the determination is YES, the battery/heater warming control request flag F_BATWARM is set to 1 (step S409), and the control terminates.

When in step S407 the determination is NO, that is, when the engine water temperature TW>the battery/heater warming determination execution lower limit water temperature #TWBWARM, it is determined whether the battery temperature TBAT of the battery 22 is below a predetermined second temperature T2, e.g., 0 degrees (step S408).

When in step S408 the determination is NO, the engine water temperature TW and the battery temperature TBAT are sufficiently high. Therefore, the process following step S406 terminates the process of forced generation to warm the heater or the battery 22.

When in step S408 the determination is YES, the temperature TBAT of the battery 22 is not sufficiently high, and the process following step S409 is performed.

The condition for starting the warming of the heater or the battery 22 to increase the engine water temperature TW is that at least one of the intake air temperature TA, the outside temperature estimated temperature TAFCMG, and the engine water temperature TW does not reach the temperature preset for each of the values TA, TAFCMG, and TW. The condition for terminating the warming process is that both the battery temperature TBAT and the engine water temperature TW reach the temperatures preset for the respective values TBAT and TW.

The variations in the remaining battery charge SOC, the engine water temperature TW, the battery temperature TBAT, and the amount of cruise charging in the cruise mode will be explained with reference to the figures.

Figure 9A:
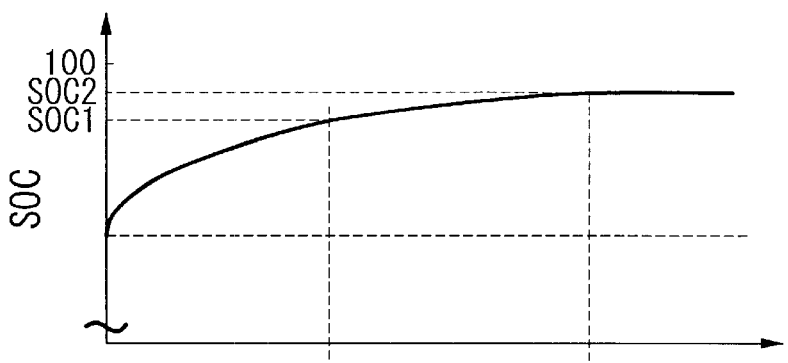
FIGS. 9A to 9D are diagrams showing variations in remaining battery charge, in engine water temperature, in battery temperature, and in cruise generation amount when the control apparatus in the hybrid vehicle shown in FIG. 1 of the present invention operates.
Figure 9B:
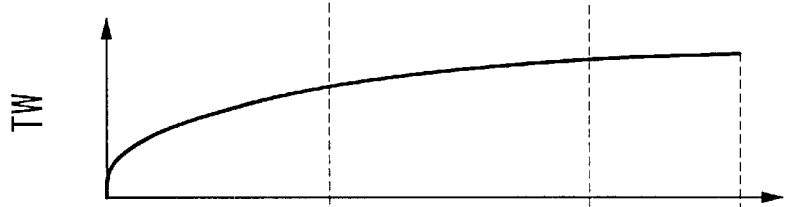
Figure 9C:
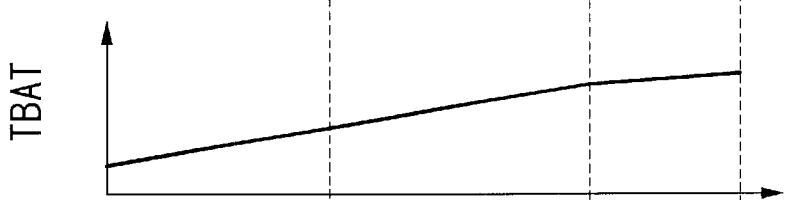
Figure 9D:
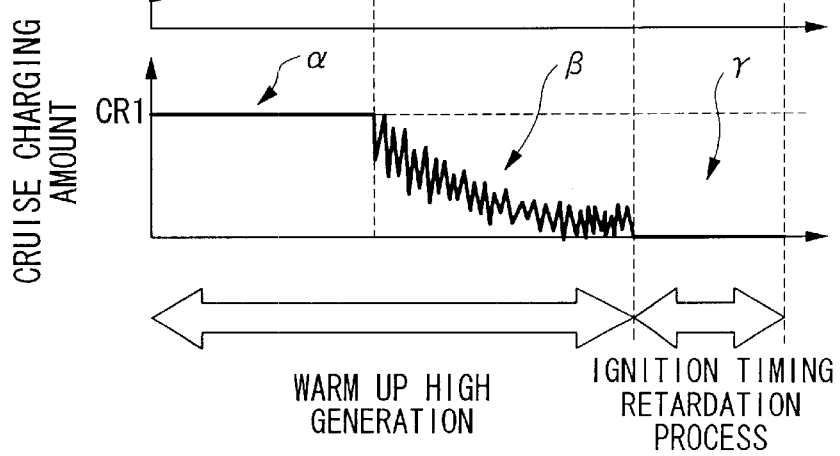
Figure 10:
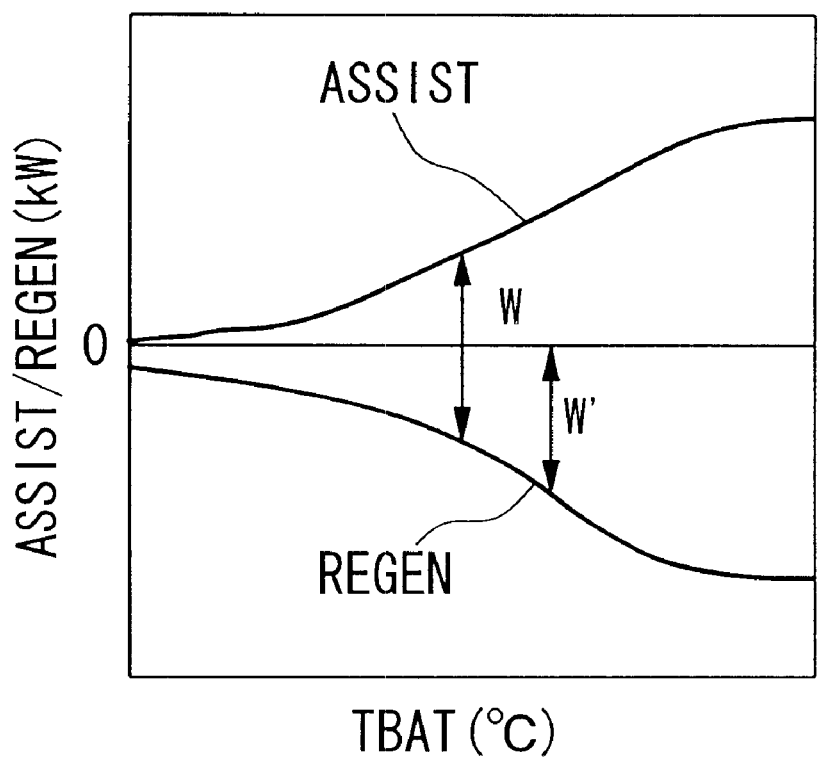
FIG. 10 is a graph showing the amount of assistance and the upper limit of the regeneration by the motor, depending on the battery temperature, according to the present invention.

In step S302 in FIG. 4, when the flow enters the high generation mode (step S303) for warming the battery and the heater, the target amount of cruise charging, which is normally set to almost zero, is increased to a predetermined value CR1, e.g., 2 kw, as shown in the area a in FIG. 9D. The charging of the battery 22 was continued until the battery/heater warming control request flag F_BATWARM is set to zero, that is, until both the battery temperature TBAT and the engine water temperature TW reach the preset temperatures.

As the charging current supplied to the battery 22 is increased, Joule heat due to the internal resistance of the battery 22 is produced. Therefore, the battery temperature TBAT rises as shown in FIG. 9C, and the engine water temperature TW rises as the load on the engine E increases, as shown in FIG. 9B.

In this case, the process following step S304 in FIG. 4, that is, the process for determining the remaining charge of the battery 22 is not performed (that is, it is skipped). Even when the battery 22 reaches over-charge zone, in which the target amount of cruise charging is zero, the charging is continued, and the internal resistance of the battery 22 is further increased.

Even when the charging of the battery 22 in over-charge zone is continued while the battery temperature TBAT is low, the damage to the battery 2 can be ignored.

As shown with the area β in FIG. 9D, when the remaining battery charge SOC reaches a predetermined first remaining charge SOC1, or when a predetermined variation in the voltage of the battery 22 is detected, it is determined that the battery 22 is in the fully-charged state, and the generation is limited within a voltage power saving range, that is, within the generation W' in the allowable width W between an assistance power saving line ASSIST and a regeneration power saving line REGEN, and regeneration power saving control gradually reduces the amount of cruise charging from the predetermined value CR1 to almost zero.

The assistance power saving line ASSIST and the regeneration power saving line REGEN are determined so as to improve the charging/discharging efficiency of the battery 22 and to protect the battery 22. Further, ASSIST and REGEN are upper limit values of the amount of assistance and of the amount of regeneration by the motor M, respectively, which are determined depending on the battery temperature TBAT of the battery 22. ASSIST and REGEN narrow the allowable width W between the amount of assistance and the amount of regeneration as the battery temperature TBAT decreases. For example, when the battery temperature TBAT is low after the vehicle has been parked in a cold area for many hours, the assistance and the regeneration are limited to small amounts.

The above-described regeneration power saving control comprises two processes: a voltage regenerated power saving process, performed by the motor ECU 11, for saving the regenerated power, based on the total voltage of the battery 22; and a regenerated power saving process performed in response to a request sent from the battery ECU 13 to the motor ECU11, depending on the voltages of the respective modules in the battery 22. One of the two processes, whose starting condition is first met, is executed. The charging is continued while gradually decreasing the target amount of cruise charging, until the remaining battery charge SOC reaches the fully-charged state.

Figure 11:
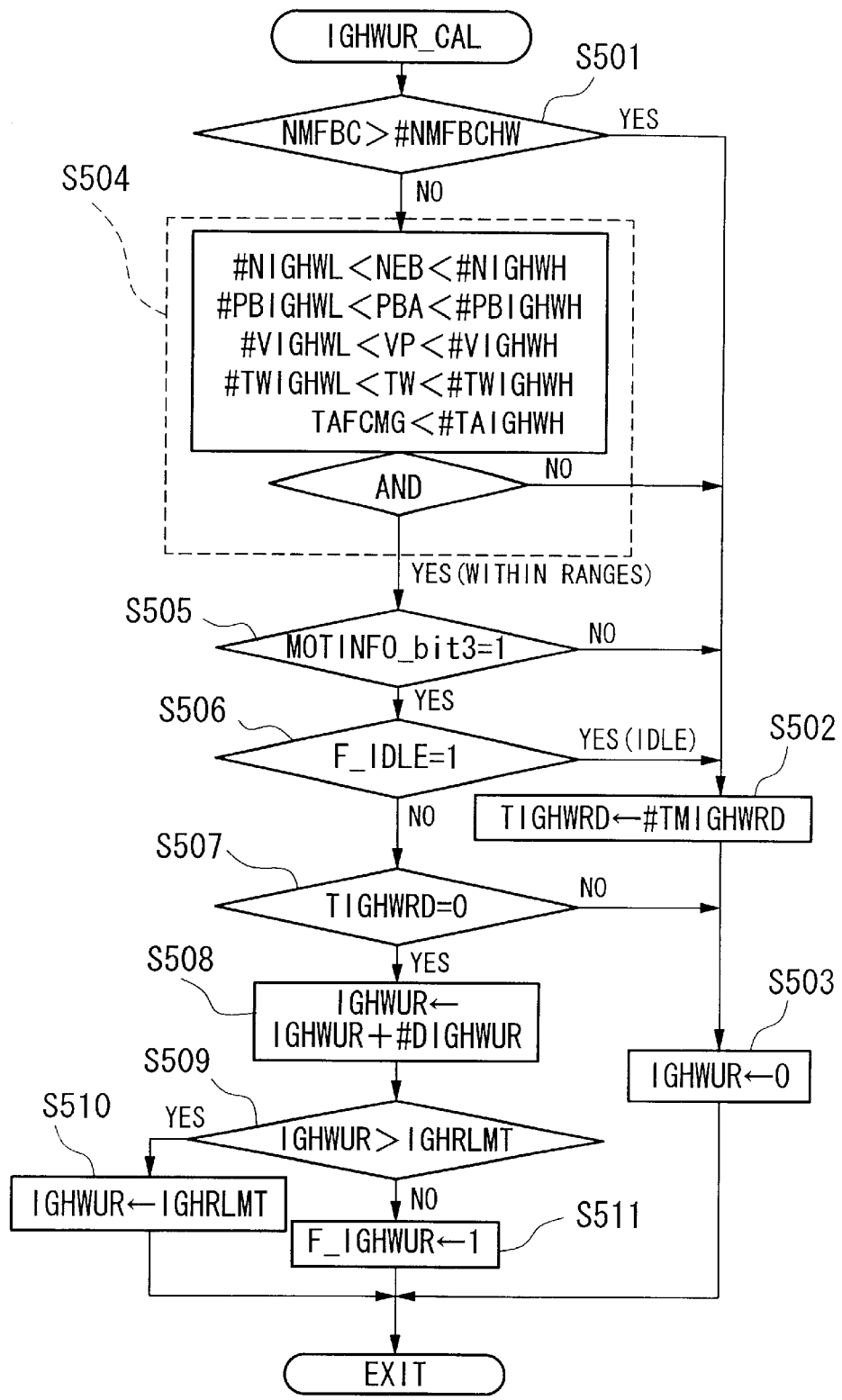
FIG. 11 is a flowchart showing ignition timing retardation control for warming the heater of the present invention.
Figure 12:
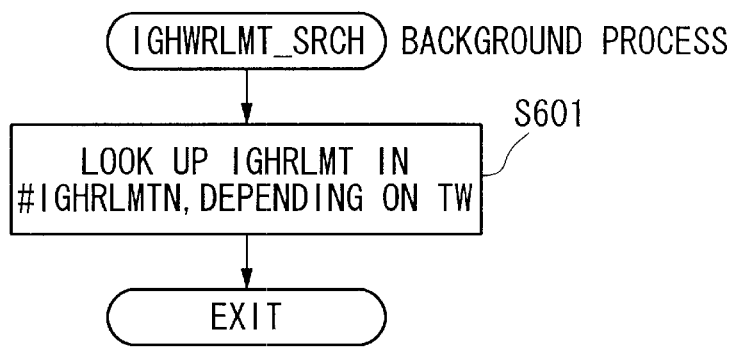
FIG. 12 is a flowchart showing the process for setting the upper limit value of the ignition timing retardation command value according to the present invention.
Figure 13:
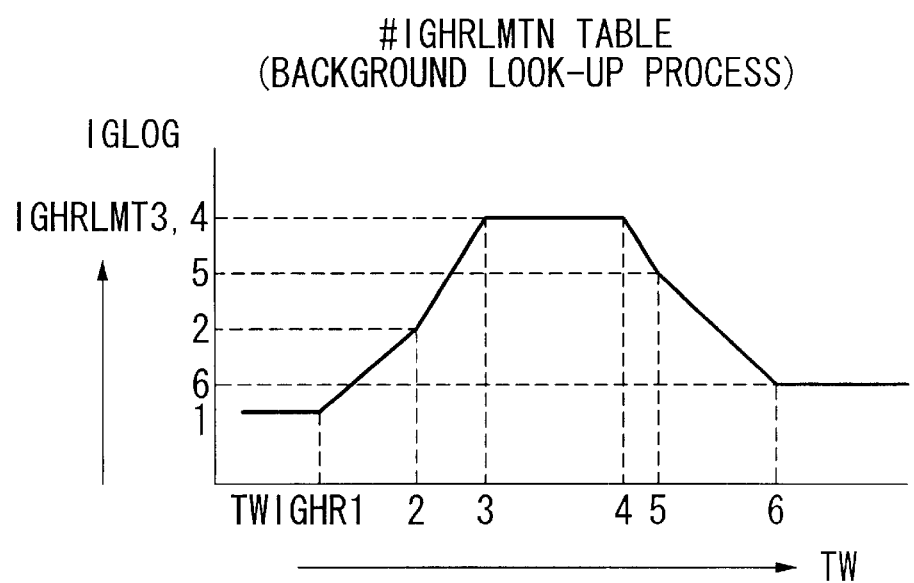
FIG. 13 is a graph showing variations in the upper limit value of an ignition timing retardation command value which depends on the engine water temperature according to the present invention.

As shown with the area γ in FIG. 9, when the battery 22 is almost fully charged and does not easily receive any charging current, ignition timing retardation (delaying) control for increasing the temperature of the heater is performed as shown in FIGS. 11 to 13. That is, the engine water temperature TW is increased by retarding (delaying) the ignition timing in the engine E so as to reduce the combustion efficiency.

The ignition timing retardation control (IGHWUR_CAL) for increasing the temperature of the heater will be explained with reference to the figures.

As shown in FIG. 11, it is determined whether the number of misfires NMFBC is above a predetermined upper limit value of the number of misfires #NMFBCHW (step S501). When this determination is YES, a retardation timer TIGHWRD is set to a retardation timer value #TMIGHWRD (step S502), an ignition timing retardation command value IGHWUR is set to zero (step S503), and the control terminates.

When in step S501 the determination is NO, the flow proceeds to step S504, and it is determined whether the condition for executing the ignition timing retardation control to warm the heater is met. That is, it is determined whether the engine speed NEB is between a predetermined lower limit engine speed #NIGHWL and a predetermined upper limit engine speed #NIGHWH, the air intake passage pressure PBA is between a predetermined lower limit air intake passage pressure #PBIGHWL and a predetermined upper limit air intake passage pressure #PBIGHWH, a vehicle speed VP which is used to control the engine is between a predetermined lower limit vehicle speed #VIGHWL and a predetermined upper limit vehicle speed #VIGHWH, the engine water temperature TW is between a predetermined lower limit water temperature #TWIGHWL and a predetermined upper limit water temperature #TWIGHWH, and the outside air estimated temperature TAFCMG is below a predetermined upper limit intake air temperature #TAIGHWH.

When in step S504 the determination is NO, the flow proceeds to step S502. That is, when the load on the engine E is high while the vehicle is cruising, the engine water temperature TW will rise. Therefore, the control for retarding the ignition timing is not performed.

When in step S504 the determination is YES, it is determined whether bit information MOTINFO_bit3 sent from the motor ECU 11 to the FIECU 12 is 1 (step S505). The bit information MOTINFO_bit3 is set to 1 in the motor ECU 11 when the remaining battery charge SOC exceeds the predetermined remaining charge SOC2, e.g., 90%, above the first remaining charge SOC1.

When in step S505 the determination is NO, the flow proceeds to step S502. When in step S505 the determination is YES, it is determined whether an idling determination flag F_IDLE is 1 (step S506). When this determination is YES, the flow proceeds to step S502.

When in step S506 the determination is NO, it is determined whether the retardation timer TIGHWRD is zero (step S507). When this determination is NO, the flow proceeds to step S503.

When in step S507 the determination is YES, the value, which was obtained by adding the ignition timing retardation command value IGHWUR to a predetermined addition factor #DIGHWUR, is set as a new ignition timing retardation command value IGHWUR (step S508).

In step S509, it is determined whether the ignition timing retardation command value IGHWUR exceeds an ignition timing retardation command upper limit value IGHRLMT looked up in a table, which will be explained in detail below.

When in step S509 the determination is YES, the ignition timing retardation command value IGHWUR is set to the ignition timing retardation command upper limit value IGHRLMT (step S510), and the control terminates.

When in step S509 the determination is NO, an ignition timing retardation control execution flag F_IGHWUR for warming the heater is set to 1 (step S511), and the control terminates.

The ignition timing retardation control (IGHWUR_CAL) for warming the heater is executed at every top dead center (TDC, or crank angular cycle) at which point the intake stroke of each cylinder in the engine E is started.

The process (IGHWRLMT_SRCH) for looking up the ignition timing retardation command upper limit value IGHRLMT, which is executed as the background process of the ignition timing retardation control (IGHWUR_CAL) for warming the heater, will be explained with reference to FIGS. 12 and 13.

The ignition timing retardation command upper limit value IGHRLMT is looked up in a #IGHRLMTN table shown in FIG. 13 and is set (step S601). The #IGHRLMTN table defines the variation of an ignition timing logic control value IGLOG, depending on the engine water temperature TW. For example, when the engine water temperature TW is within a predetermined range, the ignition timing logic control value IGLOG is maximum. Namely, when the engine water temperature TW increases, the control for retarding the ignition timing to warm the heater is not required. When the engine water temperature TW is low, the combustion in the engine E has already been retarded, and the ignition timing is not further retarded in order to prevent the deterioration of the driving performance.

The ignition timing logic control value IGLOG is a logic control value corresponding to an ignition timing angle which is calculated by looking up a map value IGMAP (not shown) in a map, depending on the engine speed NE and the air intake passage pressure PB, and by correcting this map value IGMAP, depending on the engine water temperature TW and the driving conditions. Further, the ignition timing logic control value IGLOG is corrected, depending on a delay time from the production of an ignition instructing electric signal by the FIECU 12 to the actual ignition, and is set as the actual control value IGAB (not shown) of the ignition timing.

According to the control apparatus 1 for the hybrid vehicle of the present invention, the correction coefficient KCRSRGN for correcting the amount of cruise generation is set to 1 in the cruise mode (high generation mode) so that the amount of cruise generation CRSRGN, which is normally set to zero, is increased to the predetermined value CR1, e.g., 2 kw. Then, the charging of the battery 22 is continued until both the battery temperature TBAT and the engine water temperature TW reach the predetermined temperatures. The increased charging current supplied to the battery 22 causes Joule heat due to the internal resistance of the battery 22, which warms the battery 22. Further, the load on the engine E due to the generation prompts an increase in the temperature of the engine E, thereby quickly increasing the engine water temperature TW.

Further, when the remaining charge of the battery 22 reaches the over-charged state, the charging of the battery 22 is continued until both the battery temperature TBAT and the engine water temperature TW reach the predetermined temperatures, thereby increasing the internal resistance of the battery 22 to prompt the production of the Joule heat, and further increasing the engine water temperature TW.

When the battery 22 is almost fully charged and cannot nearly receive any charging current, the engine water temperature TW is increased by retarding the ignition timing in the engine E so as to reduce the combustion efficiency. This increases the temperature of the heater which uses the increase of the engine water temperature TW for the air-conditioning in the vehicle, and the battery 22 can be warmed by the fans of the heater. As the battery 22 is warmed from a low temperature, the allowable width between the amount of assistance and the amount of regeneration by the motor M can be quickly increased.

While in the embodiment the motor ECU 11 sets the bit information MOTINFO_bit3 to 1 in the cruise mode when the remaining battery charge SOC exceeds the second remaining charge SOC2, e.g., 90%, which is above the first remaining charge SOC1, the present invention is not limited to this, and it may be determined whether a variation in specific voltage relating to the battery 22, e.g., a variation in the total voltage of the battery 22, variations in the respective voltages of the cells and modules constituting the battery 22, or a variation in the voltage of the capacitor, is detected. Even when the integrated value of the electric current for the 12V auxiliary battery 23 is cleared, the present invention can determine the situation, in which the battery 22 is almost fully charged and cannot receive any charging current, based on the variation of the voltage of the battery 22.

According to the first aspect of the present invention, in the cruise mode in which the vehicle is traveling by the driving force from the engine without the assistance of the motor, the energy generated by the motor is increased, and the charging current is supplied to the power storage unit, causing the Joule heat due to the internal resistance of the power storage unit, which warms the power storage unit. Further, the load on the engine due to the generation prompts to increase the temperature of the engine E, thereby quickly increasing the engine water temperature.

According to the second aspect of the present invention, the control apparatus for the hybrid vehicle increases the energy generated by the motor, when the intake air temperature measuring device determines that the temperature inside the air intake passage is equal to or below a predetermined temperature, when the outside air temperature calculator determines that the temperature outside the vehicle is equal to or below a predetermined temperature, or when the engine water temperature measuring device determines that the temperature of water in the engine is equal to or below a predetermined temperature.

According to the third aspect of the present invention, when it is determined that the power storage unit is overcharged while the engine water temperature is sufficiently high, the generation by the motor is prohibited, and the power storage unit is not further charged. When the generated energy increasing device increases the generated energy in order to increase the engine water temperature, the generation regulating threshold value of the remaining charge for stopping the generation by the motor is increased so that the charging of the power storage unit is continued. The charging current causes the Joule heat due to the internal resistance of the power storage unit, which warms the power storage unit. Further, the load on the engine due to the generation prompts an increase in the temperature of the engine E, thereby quickly increasing the engine water temperature.

According to the fourth aspect of the present invention, when the power storage unit is fully charged, that is, when the power storage unit cannot receive any charging current, the engine water temperature is increased by retarding the ignition timing in the engine so as to reduce the combustion efficiency. This increases the temperature of the heater, and the power storage unit can be warmed by the fans of the heater. As the power storage unit is warmed, the amount of assistance and the amount of regeneration by the motor M can be quickly increased, thereby improving the fuel consumption.

This invention may be embodied in other forms or carried out in other ways without departing from the spirit thereof. The present embodiments are therefore to be considered in all respects illustrative and not limiting, the scope of the invention being indicated by the appended claims, and all modifications falling within the meaning and range of equivalency are intended to be embraced therein.

What is claimed is:

1. A control apparatus for a hybrid vehicle with a combustion engine for outputting a driving force, an electric motor for generating a force for assisting the output from the engine, a power storage unit for storing electric energy generated by the motor acting as a generator using the output from the engine and electric energy regenerated by the motor when the vehicle decelerates, the control apparatus comprising:

an engine temperature measuring device for measuring the temperature of the engine; and a generated energy increasing device for increasing the energy generated by the motor acting as a generator when the vehicle is traveling by the driving force from the engine without the assistance of the motor, and when the engine temperature measuring device determines that the temperature of the engine is equal to or below a predetermined temperature.

2. A control apparatus for a hybrid vehicle according to claim 1, wherein the engine temperature measuring device comprises:

an intake air temperature measuring device for measuring the temperature inside an air intake passage in the engine;

an outside air temperature calculator for calculating the temperature outside the vehicle; and an engine water temperature measuring device for measuring the temperature of water in the engine.

3. A control apparatus for a hybrid vehicle according to claim 2, further comprising:

a remaining charge measuring device for measuring the remaining charge of the power storage unit; and a generation regulating threshold value corrector for increasing a threshold value for regulating the generation by the motor when the generated energy increasing device increases the energy generated by the motor, the threshold value being set depending on the remaining charge measured by the remaining charge measuring device.

4. A control apparatus for a hybrid vehicle according to claim 3, further comprising:

a voltage variation detector for detecting a variation in the voltage of the power storage unit; and an ignition timing retarding device for retarding an ignition timing in the engine when the remaining charge exceeds the threshold value and reaches the fully-charged state, or when the voltage variation detector detects a predetermined variation of the voltage.

5. A control apparatus for a hybrid vehicle according to claim 1, further comprising:

a remaining charge measuring device for measuring the remaining charge of the power storage unit; and a generation regulating threshold value corrector for increasing a threshold value for regulating the generation by the motor when the generated energy increasing device increases the energy generated by the motor, the threshold value being set depending on the remaining charge measured by the remaining charge measuring device.

6. A control apparatus for a hybrid vehicle according to claim 5, further comprising:

a voltage variation detector for detecting a variation in the voltage of the power storage unit; and an ignition timing retarding device for retarding an ignition timing in the engine when the remaining charge exceeds the threshold value and reaches the fully-charged state, or when the voltage variation detector detects a predetermined variation of the voltage.

* * * * *